US005997585A

United States Patent [19]

Scialla et al.

[11] Patent Number: 5,997,585

[45] **Date of Patent: *Dec. 7, 1999**

[54] ACTIVATED LIQUID BLEACHING COMPOSITIONS

[75] Inventors: Stefano Scialla; Raffaele Scoccianti, both of Rome, Italy

[73] Assignee: The Procter & Gamble Company, Cincinnati, Ohio

[ * ] Notice: This patent is subject to a terminal disclaimer.

[21] Appl. No.: 09/211,380

[22] Filed: Dec. 15, 1998

Related U.S. Application Data

[62] Division of application No. 08/913,376, Jan. 28, 1998, Pat. No. 5,900,187.

[30] Foreign Application Priority Data

| | | | |
|---|---|---|---|
| Mar. 27, 1995 | [EP] | European Pat. Off. | 95870026 |
| Dec. 2, 1995 | [EP] | European Pat. Off. | 95203330 |

[51] Int. Cl.$^6$ .............................. D06B 11/00; D06L 3/02; C11D 3/39; C11D 3/395; C01B 15/00

[52] U.S. Cl. .............................. 8/137; 510/283; 510/284; 510/292; 510/303; 510/312; 252/186.27; 252/186.29; 252/186.38; 8/111

[58] Field of Search ......................... 252/186.25, 186.26, 252/186.27, 186.29, 186.31, 186.38, 186.39; 510/309, 312, 283, 284, 292, 303; 8/107, 111, 137

[56] References Cited

U.S. PATENT DOCUMENTS

| | | | |
|---|---|---|---|
| 4,199,482 | 4/1980 | Renaud et al. | 8/137 |
| 4,457,857 | 7/1984 | Sepulveda et al. | 8/137 |
| 4,541,944 | 9/1985 | Sanderson | 252/186.38 |
| 4,613,452 | 9/1986 | Sanderson | 252/186.23 |
| 4,636,328 | 1/1987 | Flynn et al. | 510/277 |
| 4,909,962 | 3/1990 | Clark | 510/284 |
| 5,616,281 | 4/1997 | Hardy et al. | 252/186.38 |
| 5,713,962 | 2/1998 | Scialla et al. | 8/111 |
| 5,759,439 | 6/1998 | Kott et al. | 252/186.25 |
| 5,759,989 | 6/1998 | Scialla et al. | 510/500 |
| 5,879,584 | 3/1999 | Bianchetti et al. | 252/186.23 |
| 5,880,079 | 3/1999 | Polotti et al. | 510/309 |
| 5,908,707 | 6/1999 | Cabell et al. | 510/152 |
| 5,929,012 | 7/1999 | Del Duca et al. | 510/303 |

*Primary Examiner*—Joseph D. Anthony
*Attorney, Agent, or Firm*—Robert B. Aylor

[57] ABSTRACT

Liquid bleaching compositions are described which comprise hydrogen peroxide or a source thereof, as well as a bleach activator. The liquid bleach activator is hydrophobic, and the compositions are formulated as microemulsions of said bleach activator in a hydrophilic matrix comprising water and a surfactant system comprising an anionic and a nonionic surfactant.

4 Claims, No Drawings

ACTIVATED LIQUID BLEACHING COMPOSITIONS

CROSS-REFERENCE TO RELATED APPLICATION

This application is a divisional patent application of our application Ser. No. 08/913,376, filed Jan. 28, 1998 now U.S. Pat. No. 5,900,187.

TECHNICAL FIELD

The present invention relates to liquid bleaching compositions based on peroxygen bleaches, which are particularly useful in the bleaching of textiles.

BACKGROUND

Bleaching and cleaning compositions have been extensively described in the art. It is also well known that it can be desirable to use peroxygen bleaches rather than chlorine bleaches for a variety of reasons. In particular, peroxygen bleaches are generally considered to be milder to fabrics than chlorine bleaches. However peroxygen bleaches have the drawback that they are generally less effective at lower temperatures. In response to this drawback, peroxygen bleaching compositions have been described which further comprise a bleach activator. A bleach activator reacts with a perhydroxyl ion to yield a peracid which is the "activated" bleaching specie.

But activated bleaching compositions have the drawback that the activator and the bleach tend to react in the composition in which they are formulated. Such compositions therefore tend to be chemically unstable.

A solution to this problem has been described in EP 598 170, where a hydrophobic bleach activator was formulated in a composition with a hydrophilic bleach. The compositions in '170 were formulated as an emulsion comprising a hydrophilic phase and a hydrophobic phase. The hydrophilic phase comprised a hydrophilic nonionic surfactant and the bleach, while the hydrophobic phase comprised a hydrophobic nonionic surfactant and the hydrophobic liquid bleach activator.

These compositions are very satisfactory in terms of stability, however they impose severe restrictions in terms of flexibility in formulation. For instance, it is difficult to incorporate significant amounts of anionic surfactants in these compositions, while it may be desirable to have some of them to perform better on whiteness and stain removal, in particular on particulate and enzymatic stains, particularly clay and blood. Also, the presence of a hydrophobic nonionic surfactant may be a drawback in certain conditions. For instance, at low temperature, high dilution, and in short wash cycles, hydrophobic nonionic surfactants provide limited contribution to the overall stain removal.

Thus it is an object of the present invention to formulate an activated bleaching composition which obviates the above issues.

It has now been found that such a composition can be formulated as a microemulsion of said hydrophobic liquid bleach activator in a matrix comprising water, and a hydrophilic surfactant system comprising an anionic and a nonionic surfactant.

In EP 598 170, the compositions are specifically mentioned to be emulsions only. Also, the presence of anionics is not recommended in '170. In EP 92 932, an activated bleaching composition is described which is in the form of an emulsion, and which requires an emulsifier for said bleach activator. In WO 93900847, activated liquid bleaching composition are described which comprise a hydrophobic liquid bleach activator, acetyl triethyl citrate (ATC). Liquid compositions comprising ATC are generally described in '847, which are not in the form of microemulsions.

SUMMARY OF THE INVENTION

The compositions according to the present invention are liquid bleaching compositions comprising hydrogen peroxide or a source thereof and a liquid hydrophobic bleach activator. The compositions of the present invention are formulated as a microemulsion of said hydrophobic liquid bleach activator in a matrix comprising water, said hydrogen peroxide or source thereof, and a hydrophilic surfactant system comprising an anionic and a nonionic surfactant.

DETAILED DESCRIPTION OF THE INVENTION

The compositions of the present invention are liquid aqueous bleaching compositions. Thus, they comprise water and a bleach.

Suitable bleaches for use herein include hydrogen peroxide or water-soluble sources thereof. Indeed, in order to ensure that the bleach and the bleach activator do not react prematurely, it is essential that the bleach herein be partitioned from the bleach activator. Accordingly, the bleach should be water-soluble. Apart from hydrogen peroxide, suitable water-soluble sources thereof include perborate, percarbonate, perbenzoic and alkylperbenzoic acids, persilicate and persulfate salts and the like. Most convenient for use herein is hydrogen peroxide. The compositions of the present invention should comprise from 0.5% to 20% by weight of the total composition, preferably from 2% to 15%, most preferably from 3% to 10% of hydrogen peroxide or said source thereof.

A second essential element of the compositions herein is a liquid hydrophobic bleach activator. By bleach activator, it is meant herein a compound which reacts with hydrogen peroxide to form a peracid. The peracid thus formed constitutes the activated bleach. For the purpose of the present invention, it is essential that the bleach activator be hydrophobic in order to ensure that it is partitioned from the hydrophilic bleach, thus avoiding premature reaction between both compounds. Accordingly, by hydrophobic bleach activator, it is meant herein an activator which is not substantially and stably miscible with water. Typically, such hydrophobic bleach activators have an HLB of below 11. Such suitable liquid hydrophobic bleach activators typically belong to the class of esters, amides, imides, or anhydrides. A particular family of bleach activators of interest was disclosed in EP 624 154, and particularly preferred in that family is acetyl triethyl citrate (ATC). ATC has the other advantages that it is environmentally friendly in that it eventually degrades into citric acid and alcohol. Also, ATC has good hydrolytical stability in the compositions herein, and it is an efficient bleach activator. Finally, it provides good building capacity to the compositions. It is also possible to use mixtures of liquid hydrophobic bleach activators herein. The compositions herein should comprise from 0.5% to 20% by weight of the total composition of said bleach activator, preferably from 1% to 10%, most preferably from 2% to 7%.

As a third essential element, the compositions herein comprise a hydrophilic surfactant system comprising an anionic surfactant and a nonionic surfactant. A key factor in order to stably incorporate the hydrophobic activator is that at least one of said surfactants must have a significantly different HLB value to that of the hydrophobic activator. Indeed, if all said surfactants had the same HLB value as that of the hydrophobic activator, a continuous single phase might be formed thus lowering the chemical stability of the bleach/bleach activator system. Preferably, at least one of said surfactants has an HLB value which differs by at least 1.0 HLB unit, preferably 2.0 to that of said bleach activator.

Suitable anionic surfactants herein include water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quarternary ammonium cations derived from alkylamines such as ethylamine, diethylamine, triethylamine, and mixtures thereof, and the like). Typically, alkyl chains of $C_{12-16}$ are preferred for lower wash temperatures (e.g., below about 50° C.) and $C_{16-18}$ alkyl chains are preferred for higher wash temperatures (e.g., above about 50° C.).

Other suitable anionic surfactants for use herein are water soluble salts or acids of the formula $RO(A)_mSO_3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl-, trimethylammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$–$C_{18}$ alkyl polyethoxylate (1.0) sulfate, $C_{12}$–$C_{18}E(1.0)M)$, $C_{12}$–$C_{18}$ alkyl polyethoxylate (2.25) sulfate, $C1_2$–$C_{18}E(2.25)M)$, $C_{12}$–$C_{18}$ alkyl polyethoxylate (3.0) sulfate $C_{12}$–$C_{18}E(3.0)$, and $C_{12}$–$C_{18}$ alkyl polyethoxylate (4.0) sulfate $C_{12}$–$C_{18}E(4.0)M)$, wherein M is conveniently selected from sodium and potassium.

Other anionic surfactants useful for detersive purposes can also be used herein. These can include salts (including, for example, sodium, potassium, ammonium, and substituted ammonium salts such as mono-, di- and triethanolamine salts) of soap, $C_9$–$C_{20}$ linear alkylbenzenesulfonates, $C_8$–$C_{22}$ primary or secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl ester sulfonates such as $C_{14-16}$ methyl ester sulfonates; acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), acyl sarcosinates, sulfates of alkylpolysaccharides such as the sulfates of alkylpolyglucoside (the nonionic nonsulfated compounds being described below), branched primary alkyl sulfates, alkyl polyethoxy carboxylates such as those of the formula $RO(CH_2CH_2O)_kCH_2COO—M^+$ wherein R is a $C_8$–$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

Preferred surfactants for use in the compositions herein are the alkyl benzene sulfonates, alkyl sulfates, alkyl alkoxylated sulfates, and mixtures thereof. As mentioned hereinbefore, anionic surfactants provide improved cleaning performance. In addition, anionic surfactants herein, even at low levels, have shown to improve the physical stability of the compositions of the present invention, even at higher temperatures (up to 50° C.).

Suitable nonionic surfactants for use herein include alkoxylated fatty alcohols. Indeed, a great variety of such alkoxylated fatty alcohols are commercially available which have very different HLB values. The HLB values of such alkoxylated nonionic surfactants depend essentially on the chain length of the fatty alcohol, the nature of the alkoxylation and the degree of alkoxylation. Hydrophilic nonionic surfactants tend to have a high degree of alkoxylation and a short chain fatty alcohol, while hydrophobic surfactants tend to have a low degree of alkoxylation and a long chain fatty alcohol. Surfactants catalogues are available which list a number of surfactants including nonionics, together with their respective HLB values.

The preferred making of the compositions includes premixing the surfactants with water and subsequently adding the other ingredients including hydrogen peroxide. Eventually the hydrophobic bleach activator is incorporated. Irrespective of this preferred order of addition, it is important that during the mixing of the ingredients, the composition be constantly kept under stirring under relatively high stirring energies, preferably 30 minutes at 750 rpm, most preferably 30 minutes at 1000 rpm.

The compositions of the present invention can further be characterized by the fact that they are macroscopically transparent in the absence of opacifiers and dyes, and the compositions can further be characterized by microscopical examination and centrifugation. In centrifugation, it was observed that the compositions herein showed no phase separation after 15 minutes at 6000 RPM. Under the microscope, the compositions appeared as a dispersion of droplets in a matrix. The matrix is the hydrophilic matrix described hereinbefore, and the droplets are constituted by the liquid hydrophobic bleach activator. We have observed that the particles had a size which is typically around or below 3 micron diameter. It is believed that the compositions herein are microemulsions.

As an optional but preferred feature, the compositions herein should be formulated in the acidic pH range, preferably between 2 and 6; more preferably between 3 and 5.

As a further optional but preferred feature, the compositions herein can comprise an amine oxide surfactant according to the formula R1R2R3NO, wherein each of R1, R2 and R3 is independently a $C_6$–$C_{30}$, preferably a $C_{10}$–$C_{30}$, most preferably a $C_{12}$–$C_{16}$ hydrocarbon chain. Indeed, we have observed that improved chemical stability, i.e., lower decomposition of the bleach and the bleach activator is obtained by adding such an amine oxide. It is believed that such stability is due to the capacity of the amine-oxide to limit interactions between the bleach and the bleach activator, possibly through emulsification. It is believed that this stabilizing effect is matrix independent. Thus in another aspect, the present invention is a liquid aqueous composition comprising hydrogen peroxide or a source thereof, a bleach activator and an amine oxide.

The compositions herein are particularly useful as laundry pretreaters, i.e. in a process where said composition is applied in neat form onto soiled portions of fabrics before said fabrics are washed in a separate, typical laundry operation. Preferably, said composition in neat form is left to act on said portions for a period of time before the fabrics are washed in said laundry operation. Preferably, said composition in neat form is not left to dry onto said portions. Preferably, said period of time is in between 1 minute to 24 hours, more preferably 1 minute to 1 hour, most preferably 1 minute to 30 minutes. Optionally, when said fabrics are soiled with encrustrated stains and soils, said pretreatment process may additionally involve rubbing and scrubbing. It has been observed that in such a pretreatment process, the presence of said amine oxide further improves the cleaning performance on particulate and greasy stains. It is believed that this improvement in cleaning performance is matrix independent. Thus another aspect of the present invention is a process of pretreating fabrics, where the fabrics are pretreated with a composition comprising an amine oxide as hereinbefore defined.

To obtain either of these benefits, amine oxides herein should be present in amounts ranging from 0.1% to 10% by weight of the total composition, preferably from 1.5% to 3%.

As a further optional but preferred feature, the compositions herein can comprise from 0.5% to 5%, preferably from 2% to 4% by weight of the total composition of an alcohol according to the formula HO—CR'R"—OH, wherein R' and R" are independently H or a $C_2$–$C_{10}$ hydrocarbon chain and/or cycle. Preferred alcohol according to that formula is propanediol. Indeed, we have observed that these alcohols in general and propanediol in particular also improve the chemical stability of the compositions, i.e. lower the decomposition of the bleach and the bleach activator, as the amine oxides herein above. In addition, said alcohols lower the surface tension of the product, thus preventing superficial film or gel formation. Thus said alcohols improve the aesthetics of the compositions herein. It is believed that the chemical stabilizing effect of said alcohols is twofold. Firstly they may work as radical scavengers and secondly they may interact with the hydrogen peroxide preventing or limiting hydrolysis, therefore reducing the rate of peroxide decomposition. It is believed that this improvement in chemical stability obtained by said alcohols is matrix independent. Thus another aspect of the present invention is an aqueous composition comprising hydrogen peroxide or a source thereof, and a stabilizing amount of a said alcohol or mixtures thereof.

As a further optional feature, the compositions herein can comprise alcohol according to the following formula:

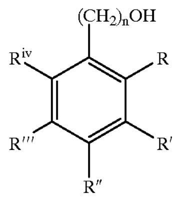

wherein n is an integer between 0 and 10, wherein R, R', R", R'" and $R^{iv}$ may be H or C1–$C_{10}$ linear or branched alkyl chains, or C1–C10 linear or branched alkenyl or alkinyl chains. Preferred alcohol according to that formula is benzyl alcohol. Indeed, we have observed that such compounds are particularly advantageous when it is desired to fomulate the present micoremulsions at low viscosity, i.e. microemulsions having a viscosity of from 5 cps to 2000 cps, preferably of from 10 cps to 500 cps and more preferably of from 20 cps to 200 cps when measured with Brookfield spindle 3 at rate 50 rpm at 20° C.

Accordinlgy, the composition of the present invention can comprise up to 20% by weight of the total composition, preferably from 0.1% to 10%, more preferably from 0.5% to 5% of alcohols having the above formula or mixtures thereof.

The compositions herein can further comprise a variety of other optionals, such as builders, chelants, radical scavengers, enzymes, brighteners, dyes, perfumes, and the like.

The compositions herein are suitable for a variety of applications, typically laundering of fabrics, especially in pretreatment operations, cleaning of carpets as well as hard surface and dishes.

The present invention will be further illustrated by the following examples.

EXAMPLES

The following compositions are made by mixing the listed ingredients in the listed proportions.

The listed proportions are expressed as weight %, based on the total compositions.

| | Example 1 | Example 2 | Example 3 | Example 4 |
|---|---|---|---|---|
| Bleach | 6% H2O2 | 6% H2O2 | 6% H2O2 | 6% H2O2 |
| Bleach activator | 3.5% ATC | 3.5% ATC | 3.5% ATC | 3.5% ATC |
| Nonionic surfactants | 6% Dob 45-7<br>6% Dob 23-6.5 | 12% Dob. 45-7 | 12% Dob 23-6.5 | 6% Dob. 45-7<br>6% Dob. 23-6.5 |
| Anionic surfactants | 12% $C_{25}AE_3S$ | 12% $C_{25}AE_{2.5}S$ | 12% NaAS | 12% NaAS |
| Amine-oxide | 1.5% | 0.5% | 1.5% | 3% |
| Propanediol | 3% | 3% | 3% | 5% |
| Water & minors | to balance | to balance | to balance | to balance |

| | Example 5 | Example 6 | Example 7 | Example 8 |
|---|---|---|---|---|
| Bleach | 3% $H_2O_2$ | 4% $H_2O_2$ | 7% $H_2O_2$ | 6.0% $H_2O_2$ |
| Bleach activator | 3.5% OCL (Octanoyl-capro-lactam) | 3.0% NVL (Nonanoyl-Valero-Lactam) | 3.5% OCL + 3.5% ATC | 3.0% Triacetin |
| Nonionic surfactants | 5% Dob. 91-10 + 2% Dob. 23-3 | 5% Dob 91-8 + | 9% Dob 45-7 + | 6% Dob 45-7 |
| Anionic surfactants | — | 10% HLAS | 6% AES | 6% AS |
| Amine-oxide | — | 1.0% | — | 1% |
| Propanediol | — | — | 3% | 3% |
| Water & minors | to balance | to balance | to balance | to balance |

| | Example 9 | Example 10 |
|---|---|---|
| Bleach | 4% H2O2 | 4% H2O2 |
| Bleach activator | 2% ATC | 2% ATC |
| Nonionic surfactants | 6% Neodol 45-7 + 3.5% Neodol 23-3 | 6% Neodol 45-7 + 3.5% Neodol 23-3 |
| Anionic, surfactants | 6% NaAS | 6% C25AE2.5S |
| Benzyl alcohol | 3% | 3% |
| Water & minors | to balance | to balance |

In the examples hereinabove, "Dob" stands for Dobanol®, a serie of nonionic surfactants which is commercially available.

The compositions were evaluated for chemical stability and the following results were measured:

Hydrogen peroxide loss: less than 2% after 4 weeks at 40° C.

Viscosity (cps at 20° C.): 200–400 for examples 1 to 8 50–80 for examples 9 to 10

Phase stability: no phase separation after 15 minutes centrifugation at 6000 rpm Bleach activator activity: 60–80% of the theoretical AvO (% activator that effectively reacts with hydrogen peroxide under washing conditions).

We claim:

1. A process of pretreating fabrics, wherein a liquid composition comprising hydrogen peroxide or a source thereof and a liquid hydrophobic bleach activator is formulated as a microemulsion of said hydrophobic liquid bleach activator in a matrix comprising water, said hydrogen peroxide or source thereof and a hydrophillic surfactant system comprising an anionic and a nonionic surfactant is applied in neat form onto soiled portions of fabrics before said fabrics are washed in a separate typical laundry operation.

2. A process of pretreating fabrics, wherein a composition is applied in neat form onto soiled portions of fabrics before said fabrics are washed in a separate, typical laundry operation, said composition comprising an amine oxide according to the formula R1R2R3NO, wherein each of R1, R2 and R3 is independently a C6–C30, hydrocarbon chain.

3. A process of pretreating fabrics according to claim 2, wherein a composition is applied in neat form onto soiled portions of fabrics before said fabrics are washed in a separate, typical laundry operation, said composition comprising an amine oxide according to the formula R1 R2R3NO, wherein each of R1, R2 and R3 is independently a C10–C30 hydrocarbon chain.

4. A process of pretreating fabrics according to claim 3, wherein a composition is applied in neat form onto soiled portions of fabrics before said fabrics are washed in a separate, typical laundry operation, said composition comprising an amine oxide according to the formula R1R2R3NO, wherein each of R1, R2 and R3 is independently a C12–C16 hydrocarbon chain.

* * * * *